United States Patent Office 2,987,486
Patented June 6, 1961

2,987,486
PROCESS FOR REGENERATING SULFUR-DEGENERATED CATALYSTS
Norman L. Carr, Crystal Lake, Ill., assignor to The Pure Oil Company, Chicago, Ill., a corporation of Ohio
No Drawing. Filed Dec. 11, 1957, Ser. No. 701,951
9 Claims. (Cl. 252—416)

This invention relates to the revivification of catalysts employed in the processing of hydrocarbons at elevated temperatures. It is more specifically concerned with the regeneration of sulfur-laden, composite catalysts consisting of an acidic oxides-base support having incorporated therein a hydrogenation component, these composite catalysts having become degenerated by contact with sulfur in the processing zone during use as a hydrocarbon processing catalyst.

According to this invention, a catalyst composition comprising a major portion of a solid, refractory, acidic, oxides-base support, and a minor portion of a base-metal hydrogenation agent which has been sulfur-degenerated in the processing of hydrocarbon feed stocks in the presence of hydrogen at elevated temperatures, is regenerated by subjecting the spent catalyst to at least two oxidation-reduction cycles in which the oxidizing, final reducing, and purging atmospheres contain water vapor at a partial pressure of at least about 20 mm. of mercury. These cycles are conducted at temperatures within the range of about 950–1100° F.

An important property with regard to the commercial applicability of a catalyst is the length of its over-all useful life. Catalyst life has two states, the first being the initial or virgin life, by which is meant the length of time that the newly prepared catalyst can be used before its initial activity has declined to an uneconomical level, and the second state with which this invention is more directly concerned. In this latter state, catalyst life is evaluated on the basis of its susceptibility to regeneration which restores the catalyst to an activity near or above its original level. The activity decline can be of a permanent nature, defined herein as deactivation, or it can be only a temporary condition defined as degeneration. This invention is concerned with a revivification or regeneration process to restore degenerated catalysts, employed in the processing of hydrocarbons at elevated temperatures, to essentially initial high activity at improved selectivity.

Catalyst compositions which consist essentially of a major portion of an oxide base having hydrocarbon cracking activity, and a small amount of a hydrogenation agent, have extensive application in the refining of hydrocarbons or mixtures thereof. In processes employing these catalysts, the reactions involved are carried out in the presence of added amounts of hydrogen. Processes of this nature include hydrogenation, hydroisomerization and the like. Feed stocks treated in these processes are generally mixtures of petroleum hydrocarbons which may contain sulfur compounds. When sulfur-containing feed stocks are used, these sulfur-sensitive catalysts more rapidly degenerate and require more rigorous regeneration techniques than would be used in otherwise normal regenerations.

Because of the elevated temperatures and the hydrogen reaction modifier which are employed, conditions conducive to hydrocracking are present. In general, this side reaction constitutes an undesirable condition because of the deleterious effect which the hydrocracking has on the ultimate yields of the products of the principal hydrogenation, hydrodesulfurization, or isomerization reaction involved. It is therefore desirable to minimize the occurrence of hydrocracking in processes employing catalysts which effect this undesirable side reaction.

It has been found that the regeneration of a sulfur-contaminated, solid, oxide-hydrogenation agent composite catalyst can be effected, and simultaneously therewith the selectivity improved, by employing the regeneration process of this invention. It is therefore an object of this invention to regenerate a sulfur-contaminated, composite catalyst consisting essentially of a solid, refractory, oxides-base catalyst, having incorporated therein small amounts of a hydrogenation agent. Another object of this invention is to improve the activity of a sulfur-contaminated, composite catalyst, consisting essentially of an oxide support and a minor amount of a hydrogenation agent, in a regeneration process which also suppresses the hydrocracking tendency of these catalysts. It is a further object of this invention to regenerate solid, refractory, acidic, oxides-hydrogenation-agent composite isomerization catalysts which have become degenerated in the processing of sulfur-containing hydrocarbon feed stocks.

According to the process of this invention, a sulfur-degenerated, hydrocarbon-processing catalyst consisting essentially of a solid, refractory, oxides support, having incorporated therein a small amount of a hydrogenation agent, is regenerated by subjecting the degenerated catalyst to a plurality of oxidation-reduction cycles. The oxidizing, final reducing, and purging atmospheres which are employed in the oxidation and reduction cycles contain water vapor at a partial pressure of at least about 20 mm. of mercury. In the regeneration process of this invention, the following generalized procedure is employed.

(1) *Hydrogen purge.*—At the conclusion of the reaction period, hydrogen flow employed in the process is continued to remove residual hydrocarbons from the system and catalyst.

(2) *Depressurizing.*—After the hydrogen purge is completed hydrogen flow is terminated and pressure in the catalyst zone is reduced to about atmospheric.

(3) *Purging.*—Any hydrogen remaining in the catalyst bed is purged therefrom by means of an inert gas, such as nitrogen, which will not deleteriously affect the efficiency of the catalyst. The purge gas is humidified so as to contain water vapor at a partial pressure of about 20 to 30 mm. of mercury.

(4) *Oxidation.*—After the inert-gas purge is completed, the catalyst and contaminants therein are oxidized with oxygen (diluted), air or other suitable gases containing free oxygen, at a temperature within the range of about 900–1100° F., care being exercised to control the oxidation so as not to exceed a temperature of about 1100° F. in the catalyst bed. A water vapor partial pressure of about 20–30 mm. of mercury is maintained in the oxidizing gas. The oxidation cycle is continued until the content of sulfur compounds in the reactor effluent exhibits a steep drop. At this point the sulfur content may have been substantially completely eliminated or reduced to a very low level, which cannot be further improved upon without the subsequent cycling steps.

(5) *Purging.*—Any oxidizing gas remaining in the catalyst bed at the completion of the oxidation step is purged therefrom at the bed temperature by means of inert gas, such as nitrogen, which has no deleterious effect on the efficiency of the catalyst. The purge gas is humidified so as to contain a water partial pressure of about 20–30 mm. of mercury.

(6) *Reduction.*—Following the purging step, the catalyst is reduced with hydrogen or a gas rich in hydrogen, at a temperature of about 850–1000° F., and preferably at about 900–975° F., for a period of time sufficient to reduce the catalyst to the most reduced state attainable under the reduction conditions. The hydrogen during this initial period of reduction is substantially dry, that is, it contains less than 5 mm. of mercury water partial pressure. When reduction with dry hydrogen is completed, it is immediately followed by reduction in a second stage with hydrogen or hydrogen-rich gas containing approximately 20-30 mm. of mercury partial pressure of water until the catalyst reaches its most reduced state under the condtions of reduction. The hydrogen is heated to a sufficient temperature and flowed through the catalyst at such a rate as to maintain the temperature within the desired range.

Where the catalyst being regenerated is to be used for the isomerization of normal paraffin hydrocarbons, such as pentane and hexane, it is preferred to carry out the first stage of the reduction at a temperature of 950–1000° F., atmospheric pressure, and with dry hydrogen containing less than 5 mm. of mercury water partial pressure. This stage will consume about 15 to 25 hours. The second stage of the hydrogen reduction is preferably carried out at temperatures of 950–975° F., with a water partial pressure of 20–25 mm. of mercury, atmospheric pressure, and for a time of 10–25 hours.

At the conclusion of the reduction step the reactor is cooled to about 825° F., with circulation of the same hydrogen gas used in the final reduction stage. Cooling below this temperature should be effected with substantially dry hydrogen.

As above pointed out, the rate of flow of hydrogen during the reduction step should be sufficient to mantain the desired reduction temperature in the catalyst. Other than that, the rate of flow is not important except when the catalyst contains a high level of metal promoter, as, for example, greater than 1% by weight. In such cases care should be exercised to use a rate of flow of hydrogen sufficiently great to prevent high water partial pressure in the atmosphere in contact with the catalyst resulting from the formation of water during the reduction reaction. Danger of high levels of water in the atmosphere can be mitigated by resorting to vacuum.

When the sulfur contamination of the catalyst is high or is difficult of removal, a series of oxidation-reduction steps as above outlined must be employed. Generally, 2 to 8 cycles will be sufficient but in extreme cases more may be necessary. It will be apparent that if a plurality of oxidation-reduction cycles is utilized, it is necessary to purge the catalyst bed with nitrogen or other inert gas subsequent to the reduction phase of the cycle and prior to instituting the oxidation step. It will also be obvious that it is not necessary to repeat Steps 1 and 2.

When the oxidation-reduction cycle is repeated, the same conditions will obtain as in the first cycle except that the time for each phase may vary as determined by the sulfur compounds in the effluent streams and the time required to condition the catalyst during the reduction step.

It is preferred to carry out the regeneration of the catalyst in reverse flow with respect to the processing flow, since it has been determined that reverse flow decreases the time needed to effect removal of sulfur compounds from the degenerated catalyst.

In order to demonstrate the effectiveness of the regeneration process of this invention, a series of experiments was conducted using a reactor having a diameter of 1″ and a length of 30″, filled with 110 grams of catalyst. The catalyst was synthetic silica-alumina cracking catalyst containing 75% by weight of silica and 25% by weight of alumina, which had been impregnated with 10% by weight of nickel molybdate and subsequently reduced. Feed stock used in these experiments was normal pentane having a total sulfur content of 20 parts per million. All the runs were carried out at a temperature of 700° F., at a pressure of 500 p.s.i.g., at a liquid hourly space velocity of 3, and a hydrogen-to-hydrocarbon mol ratio of 1. The results of the experiments are given in the following Table I. In conducting these experiments, at the conclusion of a run the catalyst bed was purged by continuing to pass hydrogen through the reactor at the rate of about 2 standard cubic feet per hour, after which the reactor was depressurized to atmospheric pressure and purged with nitrogen. The catalyst was then oxidized with a mixture of air and nitrogen composed of 30 volume percent of air and 70 volume percent of nitrogen having a water partial pressure of 30 mm. of mercury. The reactor was maintained at a temperature of 950–1000° F. during the oxidation stage and the peak burning temperature in the catalyst bed was held below 1100° F. Oxidation was continued for a period of 30–60 minutes until no sulfur dioxide was detected in the effluent gas. While the temperature of the chamber was held at 975° F., the system was purged with nitrogen having a water partial pressure of about 30 mm. of mercury, until all the oxygen was removed from the catalyst bed. Hydrogen was containing less than 5 mm. of mercury water partial pressure was then flowed through the catalyst bed at the rate of 4 standard cubic feet per hour for a period between 10 and 15 minutes, following which hydrogen gas containing a water partial pressure of 22 mm. of mercury was flowed through the catalyst bed at the same rate for about 1.5 to 2 hours. The catalyst bed was maintained at a tem-

TABLE I

*Sulfur removal from isomerization catalysts and effect of treatments on activity and selectivity for catalyst 10% $NiMoO_4$ on 75/25 silica-alumina*

| Run No. | 1 | 2 | 3 | 4 | 5 | 6 | 7 | 8 | 9 | 10 | 11 | 12 |
|---|---|---|---|---|---|---|---|---|---|---|---|---|
| Oxidation conditions: | | | | | | | | | | | | |
| Temperature, °F | None | 975 | 975 | 975 | 975 | 975 | 975 | 975 | 975 | 975 | 975 | 975–1,000 |
| Time, hours | None | ½–1 | ½–1 | ½–1 | ½–1 | ½–1 | ½–1 | ½–1 | ½–1 | ½–1 | ½–1 | ½–1 |
| $H_2O$ partial pressure, mm. Hg | None | 30 | 30 | 30 | 30 | Dry | 22 | 22 | 22 | 30 | 22 | 22 |
| Number of cycles | None | 6 | 5 | 6 | 4 | 4 | 4 | 4 | 4 | 4 | 4 | 6 |
| Dry $H_2$ reduction: | | | | | | | | | | | | |
| Time (hours) at | 16 | 1.5 | 16 | 16 | 16 | *16 | 16 | 17 | 0 | 0 | 0 | 0 |
| Temperature, °F | 975 | 975 | 975 | 975 | 975 | 975 | 975 | 975 | | | | |
| Wet $H_2$ reduction: | | | | | | | | | | | | |
| Temperature, °F | None | 975/825 | 975/825 | 975/825 | None | 975/825 | 975/825 | 975/825 | 975/825 | 975/825 | 825 | 1,050 |
| $H_2O$ partial pressure, mm. Hg | None | 22 | 22 | 22 | None | 22 | 22 | 22 | 22 | 30 | 15 | 22 |
| Time, hours | None | 1.5/2 | 1.5/2 | 1.5/2 | None | 2/2 | 2/2 | 2/2 | 18/2 | 11/3 | 16 | 6/2 |
| Results: | | | | | | | | | | | | |
| n-$C_5$ conv., percent | >51 | 32.8 | 32.6 | 31.5 | | >36 | 40.9 | 45 | 40 | 33.8 | 37 | 30.6 |
| i-$C_5$ yield, percent | ~35 | 31.7 | 31.3 | 30.1 | (²) | 30 | 38.4 | 37 | 35 | 30.5 | 29 | 28.1 |
| $C_4$ yield, percent | (¹) >16 | 1.1 | 1.3 | 1.4 | | >6 | 2.5 | 8 | 5 | 3.3 | (⁴) 8 | (⁵) 2.5 |
| Selectivity, percent | <68 | 96.5 | 96.1 | 95.6 | | <83 | 93.9 | 82 | 88 | 90.2 | 78 | 91.7 |

*Evac. ¼ hour.
¹ Hot catalyst.
² Too hot to run. Unreasonably high hydrocracking rate.
³ Hot during this and following run.
⁴ Hot at start-up.
⁵ 0.005 g. $H_2S$ added previous run.

perature of 950–1000° F. during the hydrogen reduction. The catalyst chamber was again purged with humidified nitrogen as before to remove residual amounts of hydrogen and the aforesaid oxidation, purging and reduction steps were repeated. From four to six cycles were required to condition the catalyst used in the runs included in Table I.

In runs 2 to 10, inclusive, there are given two figures for temperature during the wet $H_2$ reduction. There are also given two time periods in these same runs. In order to understand these data, an explanation will be given with respect to run 2 and will be applicable to the other runs. In run 2 wet reduction was carried out at 975° F. for a period of 1.5 hours, and then at 825° F. for a period of 2 hours.

The following conclusions can be drawn from the results of these runs.

(1) As demonstrated by run 11, a temperature of 825° F. and a water partial pressure of 15 mm. of mercury, which are outside the desired ranges, gave poor catalyst activity and an unfavorable side reaction rate. A temperature of 1050° F. and water partial pressure of 22 mm. of mercury used in run 12 also gives a low catalyst activity.

(2) As shown by run 6, the use of dry gas in the oxidation step results in a catalyst with a high side reaction rate which can be so high as to make the unit difficult, if not impossible, to operate. The same is true when dry hydrogen is used in the final reduction step, as shown by run 5.

(3) Higher catalyst activities are obtained when the water partial pressure is 22 mm. of mercury than when it is 30 mm. of mercury, while the higher water partial pressure gives higher selectivities (compare runs 7 and 8 with 2, 3 and 4).

(4) In regenerating catalysts to be used in the isomerization of pentane, the following ranges of conditions should be maintained:

Oxidation step:
    Temperatures of 900–1100° F.
    Pressure—about atmospheric
    Water partial pressure, mm. of mercury—20 to 30
    Time—about one hour
Reduction step:
    First stage:
        Temperature—925 to 980° F.
        Time—10 to 30 hours
        Pressure—approximately atmospheric
        Hydrogen—dry
    Second stage:
        Temperature—950 to 980° F.
        Time—15 to 20 hours
        Pressure—approximately atmospheric
        Hydrogen having a water partial pressure, mm. of mercury—20 to 25

In other experiments, severe hydrocracking activity was observed when catalysts consisting of 8% nickel and 15% molybdenum (as molybdena) on alumina, and 8% copper and 14% molybdenum (as molybdena) on alumina, were regenerated with dry gases in the absence of water. These catalysts, which would be expected to possess less hydrocracking activity than those having silica-alumina bases, induced severe hydrocracking which resulted in run-away temperatures when processing hydrocarbon feed stocks at only 600° F. was attempted. In contradistinction to these results, these catalysts exhibit very low hydrocracking activity when regenerated according to the process of this invention.

Catalysts which can be regenerated in accordance with this invention are composites comprising a major portion of a refractory, oxide support, composited to evince hydrocarbon cracking activity, and having incorporated therein a small amount, viz., 0.5 to 15% by weight, of a base-metal hydrogenation agent. Specific examples of the refractory base include but are not limited to silica-alumina, silica-magnesia, silica-zirconia, silica-titania, silica-boria, alumina-zirconia, alumina-beryllia, alumina-boria, silica-chromia, boria-titania, silica-alumina-zirconia, silica-alumina-beryllia, acid-treated clays, activated alumina and other hydrocarbon cracking catalysts of the oxide type. The base-metal hydrogenation agent which is employed can be a group VIII metal of the Iron Series; oxides of a polyvalent metal of groups V, VI and VII; or heat-stable metal salts of the oxyacids of polyvalent metals of groups V, VI and VII. Specific examples of suitable base-metal hydrogenation agents include but are not limited to cobalt, nickel, tungsten oxide, molybdenum oxide, chromium oxide, manganese oxide, and vanadium oxide; and cobalt and nickel salts of the oxyacids of tungsten, molybdenum, chromium, vadanium, and manganese, e.g., nickel tungstate, cobalt molybdate, nickel molybdate, etc. It has been found that catalyst carriers containing 50–87% silica and 50–13% alumina, having incorporated therein 2 to 10% by weight of the hydrogenation agent, have superior activities for use as isomerization catalysts. Other catalyst compositions, however, may be preferred for use in hydroisomerization, hydrodesulfurization, or hydrogenation. These catalyst compositions can be prepared employing conventional methods of preparation involving impregnation, precipitation, or other techniques described by Emmet in Catalysis, Reinhold, 1955.

The humidification of the oxidizing and reducing gases can be effected by employing conventional direct or indirect humidification techniques. To add sufficient amounts of water to provide the desired partial pressure, the humidity [1] of the gas stream can be employed as the criterion, if desired, because this property is related to the partial pressure of the water being carried. If $p$=partial pressure of water, absolute units
$P$=total pressure of the gas-water mixture, abs. units
$M_w$=molecular weight of the water
$M_g$=molecular weight of the gas $$\text{Humidity (lb. Water/lb. dry gas)} = \left(\frac{p}{P-p}\right)\left(\frac{Mw}{Mg}\right)$$

In addition, water partial pressure can also be calculated from the wet-bulb depression of the processing gas resulting from its humidification or dehumidification. (See Unit Operations, Brown, et al., Wiley, 1950, Chap. 37). Humidification of the processing gases preferably is carried out using an indirect system in which the water is sprayed into the processing gas before it contacts the catalyst being water-equilibrated. To determine the proper humidity conditions, although the processing streams employed may not be air, results within the range of engineering accuracy can be obtained for gases of mol wt. of about 28 employing humidity charts for air-water systems. Of course, if the pychometric properties of the processing gas-air system actually employed are available, these should be used. In carrying out the instant invention, although other humidification procedures can be used, it is preferred to use an indirect humidification system, such as a packed tower, wherein water and the processing gas are counter-currently contacted under conditions such that the gas is saturated with water at the selected conditions of temperature.

At dynamic equilibrium between a water phase and a gas, the vapor pressure of the water will be equal to the partial pressure of water in the processing gas effluent from the humidifier. Although this assumes ideal gas conditions, analysis of the effluent processing gas corroborates the accuracy of this technique. In general, the humidification will be carried out at pressures within the range of 0 to 50 p.s.i.g. and temperatures within the range of about 60° F. to 80° F.

---
[1] Partial pressure is fundamental—is independent of total pressure, temperature of gas, molecular weight of gas, etc.

In the aforementioned illustrative example, a column 1" in diameter and 6" long, filled with beryl saddles, was used to effect the humidification of the oxidizing, reducing, and purging gases employed in the regeneration process of this invention. The gas rates were such as to result in the saturation of the gas at the desired temperature. For example, to provide a partial pressure of 22 mm. of mercury, the water was introduced at about 75° F. The tower was operated countercurrently and at atmospheric pressure.

In effecting the humidification it is necessary that systems which incorporate water in the form of large droplets be used in order to avoid water entrainment. Humidity control can be effected by dew-point measurements or other conventional humidification controls. It can be noted in the data reported in Table I that increasing the partial pressure of water in the regeneration gases tended to decrease the isomerization activity. Accordingly, in employing the process of this invention for the regeneration of sulfur-contaminated, promoted, acidic, oxides-base isomerization catalysts, it is desirable to avoid exceeding a partial pressure of about 30 mm. of mercury. In cases wherein hydrocarbon reactions are not desired over the catalyst, viz., hydrodesulfurization, the regeneration can be carried out using steam as the inert gas or diluent during oxidation. The optimum range which is to be utilized in regenerating sulfur-contaminated catalysts used in other types of hydrogen-consuming, hydrocarbon-processing operations can be determined experimentally. In general, the partial pressure of water within the regeneration gases should be not less than about 20 mm. of mercury, with about 20–30 mm. of mercury being preferred and most advantageous.

The purging steps employed in conjunction with the oxidation-reduction cycle can be carried out employing any inert gas, such as nitrogen, or other gases substantially free from sulfur compounds, $H_2S$, and CO, or other components which will react with or deleteriously affect the constituents of the catalyst composition. The rate at which the purging gas is introduced should be sufficient to effect the removal of oxidation gases, or reducing gases, from the catalyst bed within a reasonable time. The oxidizing gas rate utilized will be determined by the amount of sulfur contained in the catalysts, and the concentration of oxygen in the gas, as well as the peak burning temperature which is to be maintained. It is to be noted that during the oxidation step the peak burning temperature should not be in excess of about 1100° F. to avoid deleteriously affecting the activity of the catalysts. Each oxidation step of the plurality of oxidation-reduction cycles is carried out for a time sufficient to produce an oxidation effluent which is substantially free from $SO_2$. In carrying out the reduction steps of the regeneration cycle, flow rates of the selected reducing gas should be employed which are sufficient to effect the substantially complete reduction of the reducible constituents of the composite catalyst to their lowest state of valency at the conditions employed in the reduction.

Although the instant invention has been illustrated with reference to the regeneration of a hydrogenation agent-, oxides-base composite isomerization catalyst, it is evident that the instant invention has application in the regeneration of sulfur-contaminated catalysts employed in other hydrocarbon processes utilizing hydrogen, such as hydrogenation, hydrodesulfurization, and the like. In addition, humidification techniques other than those above described, as well as other operational procedures will be obvious to those skilled in this art. It is, therefore, intended that the invention be limited only as specifically set forth in the appended claim structure.

I claim as my invention:

1. A process for regenerating a refractory, acidic, oxides-base, hydrocarbon-cracking catalyst consisting of at least one material selected from the group consisting of silica and alumina having incorporated therein about 0.5 to 15% by weight of a base-metal hydrogenation agent consisting of at least one material selected from the group consisting of cobalt, nickel, copper, tungsten oxide, molybdenum oxide, chromium oxide, manganese oxide, vanadium oxide, and cobalt and nickel salts of the oxyacids of tungsten, molybdenum, chromium, vanadium, and manganese, said catalyst having become sulfur-degenerated by contact with sulfur contaminants in a reaction zone during use in promoting the vapor phase treatment of sulfur-containing hydrocarbon feed stocks in the presence of added amounts of hydrogen at an elevated temperature and superatmospheric pressure, said process comprising reducing the pressure in said reaction zone to substantially atmospheric pressure while maintaining said elevated processing temperature, and subjecting said catalyst to an oxidation-reduction cycle which comprises introducing during the oxidation stage of said cycle a gaseous oxygen-containing oxidizing medium, at a rate sufficient to react with said sulfur contaminants, into said reaction zone thereby producing a sulfur-containing effluent, continuing the flow of oxidizing medium for a time and at a rate sufficient to provide an effluent substantially free from sulfurous constituents while maintaining said reaction zone at a temperature of about 900–1100° F., purging the oxidizing medium and oxidation products from said reaction zone, and thereafter reducing the catalyst in a plural-stage reduction operation by introducing a gaseous, hydrogen-containing, reducing medium into said reaction zone, which is at a temperature of about 850–1000° F., in an amount and at a rate sufficient to reduce the reducible constituents of the thus-oxidized catalyst to the lowest state of valence attainable under the reducing conditions employed, said oxidizing and final reducing media containing water at a partial pressure of about 20–30 mm. of mercury, purging said reducing medium from said reaction zone and repeating said oxidation-reduction cycle until substantially no sulfurous constituents are produced in the effluent during the initial oxidizing phase of said cycle.

2. A process in accordance with claim 1 in which the purging of the reaction zone intermediate to said oxidizing stage and said reducing stage is effected by reducing the pressure in said reaction zone to a subatmospheric pressure.

3. A process in accordance with claim 1 in which said hydrocarbon-cracking catalyst is alumina and has impregnated thereon about 8% by weight of nickel and about 15% by weight of molybdena.

4. A process in accordance with claim 1 in which said hydrocarbon cracking catalyst is alumina and has impregnated thereon about 8% by weight of copper and about 14% by weight of molybdena.

5. A process for regenerating a refractory, acidic, oxides-base, hydrocarbon-cracking catalyst consisting of 50–87% by weight of silica and 13–50% by weight of alumina having incorporated therein about 0.5–15% by weight of a base-metal hydrogenation agent consisting of at least one material selected from the group consisting of cobalt, nickel, copper, tungsten oxide, molybdenum oxide, chromium oxide, manganese oxide, vanadium oxide, and cobalt and nickel salts of the oxyacids of tungsten, molybdenum, chromium, vanadium, and manganese, said catalyst having become sulfur-degenerated by contact with sulfur contaminants in a reaction zone during use in promoting the vapor phase treatment of sulfur-containing hydrocarbon feed stocks in the presence of added amounts of hydrogen at an elevated temperature and superatmospheric pressure, said process comprising reducing the pressure in said reaction zone to substantially atmospheric pressure while maintaining said elevated processing temperature, and subjecting said catalyst to an oxidation-reduction cycle which comprises introducing during the oxidation stage of said cycle a gaseous oxygen-containing oxidizing medium into said reaction zone at a rate sufficient to react with said sulfur contaminants, thereby producing a sulfur-containing effluent, continuing the flow of oxidizing medium for a time and at a rate sufficient to provide an effluent substantially free from sulfurous constituents while maintaining said reaction zone at a temperature of about 900–1100° F., introducing an inert, gaseous purgative into said reaction zone to effect the substantially complete removal of the oxidizing medium and oxidation products from said reaction zone, and thereafter reducing the catalyst in a plural-stage reduction operation by introducing a gaseous hydrogen-containing reducing medium into said reaction zone, which is at a temperature of about 900–1000° F., in an amount and at a rate sufficient to reduce the reducible constituents of the oxidized catalyst to the lowest valence state obtainable under the reducing conditions employed, said oxidizing and final reduction media containing water at a partial pressure of about 20–30 mm. of mercury, introducing an inert gaseous purgative into said reaction zone to effect the substantially complete removal of the reducing medium from said reaction zone, and repeating said oxidation-reduction cycle until substantially no sulfurous constituents are produced in the effluent from the initial oxidizing phase of said cycle.

6. A process in accordance with claim 5 in which the base-metal, hydrogenation agent is nickel molybdate.

7. A process for regenerating a refractory, oxide-base, hydrocarbon-cracking catalyst consisting of about 75% silica and 25% alumina having incorporated therein about 10% by weight of nickel molybdenate, said catalyst having become sulfur-degenerated by contact with sulfur contaminants in a reaction zone during use in promoting the vapor phase treatment of a sulfur-containing hydrocarbon feed stock in the presence of added amounts of hydrogen at an elevated temperature and superatmospheric pressure, said process comprising terminating the introduction of the hydrocarbon feed stock into said reaction zone, continuing the flow of added amounts of hydrogen to effect the substantially complete stripping of reaction products from said reaction zone, reducing the pressure in said reaction zone to substantially atmospheric pressure while maintaining said elevated processing temperature, and subjecting said catalyst to an oxidation-reduction cycle which comprises introducing during the oxidation stage of said cycle a gaseous oxygen-containing oxidizing medium, at a rate sufficient to react with said sulfur contaminants, into said reaction zone thereby producing a sulfur-containing effluent, continuing the flow of oxidizing medium for a time and at a rate sufficient to provide an effluent substantially free from sulfurous constituents while maintaining said reaction zone at a temperature of about 900–1100° F., purging the oxidizing medium and oxidation products from said reaction zone, and thereafter during the reduction phase of the cycle introducing in at least two stages, a gaseous hydrogen-containing, reducing medium into said reaction zone, which is at a temperature of about 925–975° F., in an amount and at a rate sufficient to reduce the reducible constituents of the thus-oxidized catalyst to the lowest state of valence attainable under the reducing conditions employed, the hydrogen-containing reducing medium introduced in the initial stage being substantially dry and said oxidizing and final reducing media containing water at a partial pressure of about 20–30 mm. of mercury, purging said reducing medium from said reaction zone and repeating said oxidation-reduction cycle until substantially no sulfurous constituents are produced in the effluent from the initial oxidizing phase of the said cycle.

8. A process in accordance with claim 7 in which the purging of the reaction zone intermediate between said oxidizing phase and said reducing stages is effected by reducing the pressure in said reaction zone to a subatmospheric pressure.

9. A process in accordance with claim 7 in which the purging of the reaction zone between the oxidizing and reducing stages is effected by flowing an inert gas therethrough at approximately atmospheric pressure.

References Cited in the file of this patent

UNITED STATES PATENTS

| 2,273,864 | Houdry | Feb. 24, 1942 |
| 2,455,419 | Johnson | Dec. 7, 1948 |